C. DRABEK.
SPRING TIRE FOR VEHICLE WHEELS.
APPLICATION FILED JAN. 3, 1917.
1,337,445.
Patented Apr. 20, 1920.
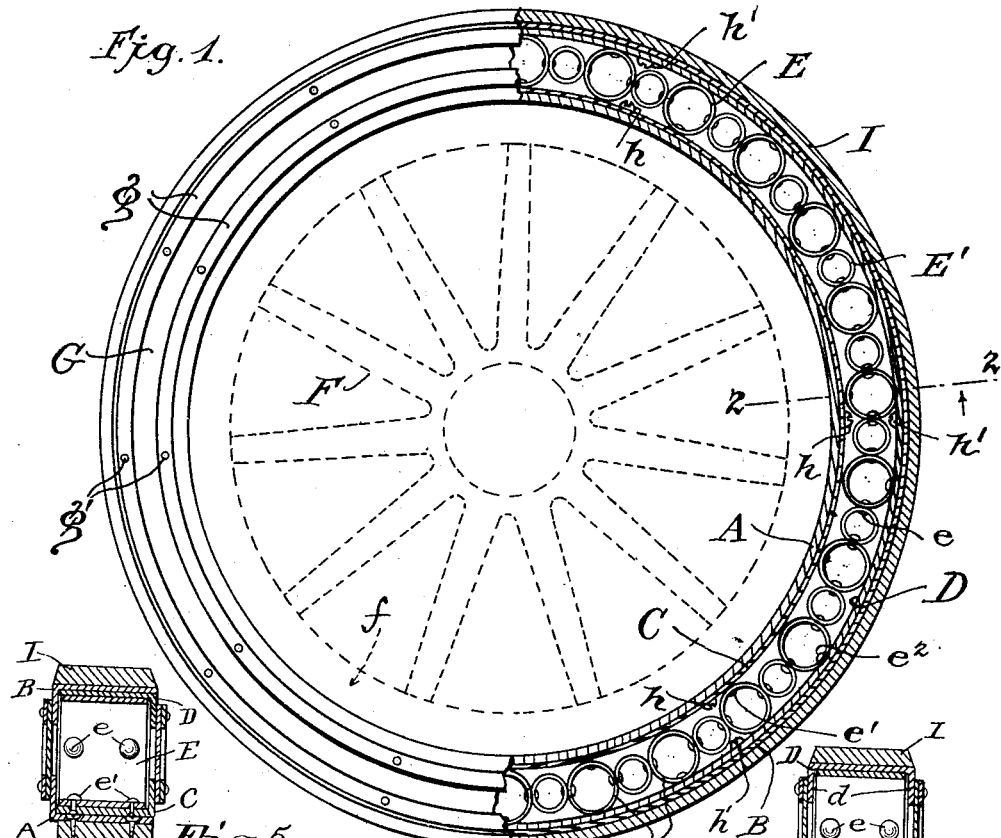
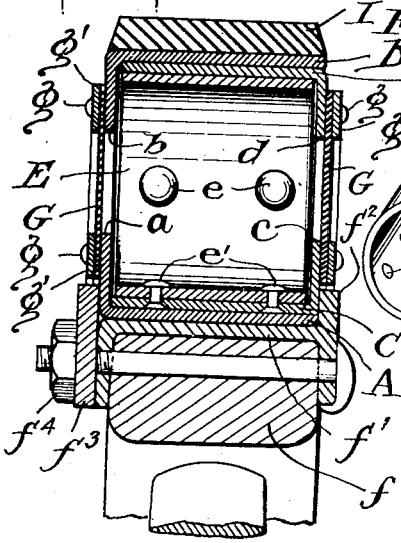
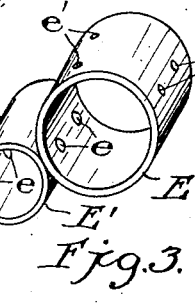
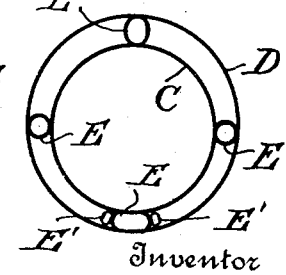
Inventor
Charles Drabek.
By His Attorney
Jas. H. Griffin

UNITED STATES PATENT OFFICE.

CHARLES DRABEK, OF CLEVELAND, OHIO, ASSIGNOR TO THE DRABEK EQUALIZER COMPANY, OF CLEVELAND, OHIO, A CORPORATION OF OHIO.

SPRING-TIRE FOR VEHICLE-WHEELS.

1,337,445.            Specification of Letters Patent.        Patented Apr. 20, 1920.

Application filed January 3, 1917. Serial No. 140,368.

*To all whom it may concern:*

Be it known that I, CHARLES DRABEK, a citizen of the United States, residing in the city of Cleveland, county of Cuyahoga, and State of Ohio, have invented a certain new and useful Spring-Tire for Vehicle-Wheels, of which the following is a specification.

This invention is a spring tire for vehicle wheels, and the object of the invention is a tire of the character specified which is simple in construction, economical to manufacture, efficient in operation and durable in wear.

Speaking generally, the invention embodies a plurality of springs, suitably mounted and positioned, intermediate the felly, or its equivalent, and the tread or rim of the wheel. The springs, preferably band springs, in ring form, are made up of two series of different diameters, the members of one series alternating with those of the other, and said springs are, preferably, rivetedly united along a circumferential line concentric with, and substantially intermediate of, the felly and the rim or tread.

The members of the series of large springs are connected to either the rim or the felly, or equivalent, it being preferred to connect them, alternately, with the felly and the tread, and to leave each spring free or disconnected at that portion thereof diametrically opposite its point of connection.

The members of the series of small springs alternate with, or interspace, the large springs, and said small springs are preferably of such diameter that, even when compressed, their extended portions do not contact with either the felly or the tread.

The compression of the large springs, radially of the wheel, causes a compression of the small springs circumferentially of the wheel, with a certain amount of rolling action of the free portions of the larger springs, either on the felly or the inner surface of the tread, depending on whether such free ends are contiguous to the felly or the tread.

While the springs are all preferably connected as described, there is no undue rigidity or stiffness in their unitary assemblage, due, mainly, to the facts that the smaller springs are readily compressed, as described, to compensate for the compression of the larger springs, and the free or disconnected portions of the latter readily permit of a more or less bodily movement thereof, hereinbefore referred to as a rolling action, thereby enabling them to efficiently absorb the shocks transmitted from the adjoining larger springs.

The arrangement and mounting of the springs, as described, results in a tire having pronounced movability or resiliency, and the shocks received at a given point, instead of being absorbed or counteracted locally, are quickly distributed substantially throughout the entire spring structure, thereby minimizing the shocks transmitted to the vehicle.

Structural and functional features of the invention, other than those described, will appear from the hereinafter detailed description, read in conjunction with the annexed drawings.

In the accompanying drawing I have illustrated one practical embodiment of the present invention, but the construction shown therein is to be understood as illustrative, only, and not as defining the limits of the invention.

Figure 1 is a side elevation of a wheel embodying the present invention, portions of said wheel being shown partly in section, in the interest of clearness. In this showing the felly band and connections therefor are omitted for the sake of clearness.

Fig. 2 is a section taken on line 2—2 of Fig. 1.

Fig. 3 is a perspective detail of the preferred forms of spring members employed, showing the manner in which the springs of the two series are joined together.

Fig. 4 is a diagrammatic view illustrating the operation of the wheel, and

Figs. 5 and 6 are views corresponding to the showing of Fig. 2, but illustrating modified forms of the invention.

Referring to the drawing, A and B are two annuli, hereinafter termed the felly and tread annuli, respectively, while C and D designate two additional annuli, hereinafter termed the inner and outer rings, respectively. Parts A and C may be secured in engaging concentric relation by means of screws $h$ and the parts B and D may be similarly secured together by screws $h'$ as shown in Fig. 1.

The inner and outer rings C and D are of different diameters, and are normally spaced apart in concentric relation by means of a plurality of series of spring members. Two series of such members are shown, one series comprising a plurality of circular band springs E, while the other series embodies a plurality of similar springs E'. These two series are arranged in alternate sequence around the outer circumference of the inner ring C, and within the inner circumference of the outer ring D. The difference in diameter of said rings and the diameters of the spring members E is such that the outer and inner rings will be in tangential contact with said members. One of the smaller spring members E' is positioned between each two consecutive larger members E, as shown in Figs. 1 and 3, but is of such diameter that, while tangentially engaging with the adjacent larger members, said smaller member is free from engagement with either the inner or outer rings C D.

The succesive members of both series are preferably riveted or otherwise secured together, as at $e$, at their points of contact, while the members E, of the greater diameter, are secured alternately, by rivets or other fastening devices $e'$ $e^2$, to the inner and outer rings C D, respectively. It will thus be manifest that the inner and outer rings C and D, secured together in spaced relation by the resilient members, constitute a resilient unit, all of the parts being secured together so that none of the elements will become inadvertently disassociated from the remaining elements. In the form of the invention illustrated, the resilient unit is made demountable; that is to say, it may be attached to, or detached from, a vehicle wheel in the manner next to be described.

The felly annulus A is of such diameter that it may be readily secured circumferentially of the felly of an automobile wheel, and either directly thereto by means of bolts or analogous means, or detachably secured thereon after the manner of the well known demountable rims. For the purpose of illustration, the latter form is shown, F designating a vehicle wheel having the usual felly $f$, provided circumferentially with the usual felly-band $f'$, with which is associated any well known form of demountable connection. In the form shown, the felly-band is provided along one of its edges with an integral flange $f^2$, while at its other edge may be secured a removable flange $f^3$ through the medium of bolts $f^4$, as is common.

Felly annulus A is of an interior diameter substantially the same as, or slightly greater than, the circumferential diameter of felly-band $f'$, while tread annulus B is of a diameter substantially the same as, or slightly greater than the outer circumference of the outer ring D. Thus, the resilient unit is adapted to be slipped laterally between said felly and tread annuli A and B into the position shown in Fig. 2 of the drawing. It will be noted from this figure that the inner and outer rings C and D are provided along the same side of each with outwardly and inwardly extending flanges $c$ and $d$, respectively, and that the felly and tread annuli are provided with similar flanges $a$ and $b$ at their opposite edges. Thus, when the parts are assembled as described, the flanges $a$ and $b$ partially house the springs E E' at one of the lateral sides thereof, while flanges $c$ and $d$ similarly house the other sides of the springs.

To preclude dust, dirt, or other foreign matter, from coming into contact with the springs, the distance between the free edges of the flanges $a$ and $b$ is bridged by a web G, preferably of rubber or other yielding and flexible material, which is secured at its inner and outer edges to the flanges $a$ and $b$ by suitable means, such as the screws $g$ acting through binding strips $g'$. In like manner, the gap between the free edges of the flanges $c$ and $d$ is also bridged, so that the springs are entirely incased and protected against the action of foreign matter.

The entire resilient unit, assembled as described, is, when the removable flange $f^3$ of the felly-band is detached from its locking position, adapted to be slipped, as a unity, over the felly-band, and said flange $f^3$ thereafter placed in position and locked in place by the bolts $f^4$. The flanges $f^2$ and $f^3$ of the felly-band are of sufficient depth to engage the flanges $c$ and $a$, respectively, so that, when the bolts are tightened, the felly annulus A and the inner ring C are tightly locked against relative lateral movement and are simultaneously secured to the wheel. The maintaining of the annular members A and C, in juxtaposition need not, however, be dependent upon the engagement of the felly-band flanges as the parts A and C may be secured together by screws $h$. In like manner, the annular members B and D may be secured together by screws $h'$. When the screws $h$ are employed the felly-band flanges simply serve to hold the spring tire on the felly while the screws hold the annular members of the tire together.

The outer circumference of tread annulus B may be either left free and thereby provide a metallic tread surface, or may, if desired, be provided with a tread member I of rubber, fiber, or other suitable material, to render the travel of the wheel noiseless.

When a wheel, organized as specified, travels along a road, with weight imposed upon the axle, said weight is carried by the springs. The spring E nearest the point of contact of the wheel with the ground will receive the greatest weight and will be compressed to the greatest degree, while the spring E diametrically opposite from said ring will be relieved of weight, the two intermediate springs at opposite sides of the wheel marking substantially the neutral point. This is clearly shown in Fig. 4, where the large spring E at the bottom is shown greatly compressed, and the two similar springs at the sides in their substantially normal positions, while the large spring at the top is shown as extended vertically. This is due to the fact that, as the springs of the two series E and E′ are in contact throughout the circumference of the wheel, the compression of one of said springs must necessarily affect all, since, because of the fixed circumference of the outer ring D, bodily expansion of the resilient unit is impossible. Thus, as the spring E at the bottom of Fig. 4 is flattened out circumferentially of the wheel, as shown, other springs of the two series must be flattened out in a direction radially of the wheel, though not necessarily to the same extent as the bottom spring E. At any rate, the flattening out of the remaining springs must be sufficient to compensate for the flattening out of said bottom spring. Thus, it will be seen in Fig. 4 that the bottom spring E is flattened out circumferentially of the wheel, while the two adjacent smaller springs E′ are flattened out radially of the wheel. In like manner, the next two larger springs E (not shown) are more or less flattened out circumferentially of the wheel, while their next adjacent smaller springs are also flattened out radially of the wheel, and so on.

It will thus appear that, as the wheel rolls along the ground, the axle travels along at a constant height from the ground, while the outer ring D and tread annulus B move in gyratory relation to the inner ring C, and, during such travel, the weight on the axle is carried by all of the springs of both series. That is to say, as one or a plurality of rings are compressed in one direction, the remaining rings are compressed in the opposite direction, so that the weight imposed upon the wheel is carried by, and distributed throughout, all of the springs of both series. This transmission of the weight through all of the springs is allowed by the securing of the successive springs of the larger series alternately to the inner and outer rings C and D, so as to allow of the rolling action of said springs circumferentially of the wheel. If each of said springs were rigidly secured to both the inner and outer rings, it is manifest that they could not work circumferentially of the wheel and each serve to compensate for the weight imposed upon another. The springs E′ of the smaller series may be said, in a measure, to be truly compensating in their nature, since their main function is to compensate by radial elongation for the circumferential elongation of the springs of the larger series, which, in effect, are the direct carriers.

In the preferred embodiment of the invention illustrated, the resilient unit is shown as demountable. It will be understood, however, that the invention is not limited in this respect. If desired, the felly annulus A may be secured directly to the felly of the wheel, as shown in Fig. 5, thereby dispensing with the felly-band and making the felly annulus A serve as this element, or the inner and outer rings C D may be secured to the felly and tread I, respectively, and flanges similar to the flanges c and d positioned at the other lateral edge of the respective rings C and D, as shown in Fig. 6.

There are various other ways in which the particular form of the invention illustrated may be modified without departing from the spirit of the invention, and it is, therefore, to be understood that the invention is not limited to the particular illustrative showing made, but is as broadly novel as is commensurate with the appended claims.

Having thus fully described the invention, what I claim as new, and desire to secure by Letters Patent, is:

1. A spring tire embodying an inner annular member adapted to be positioned over the felly of a vehicle wheel, and a larger outer annular member, in combination with two series of springs of different sizes positioned between said inner and outer annular members, the larger springs serving to normally maintain the annular members in spaced concentric relation, and the smaller springs alternating with the larger springs, whereby a small spring is positioned intermediate each two large springs, some of said larger springs being attached to the inner annular member and unattached to the outer annular member and others of said larger springs being attached to the outer annular member and unattached to the inner annular member.

2. A spring tire embodying an inner annular member adapted to be positioned over the felly of a vehicle wheel, and a larger outer annular member, in combination with two series of springs of different sizes positioned between said inner and outer annular members, the said two series of springs being secured together, with the smaller springs interspacing the larger ones, some of said larger springs being attached to the inner annular member and unattached to the outer annular member and others of said larger springs being attached to the outer annular member and unattached to the inner annular member.

3. A spring tire for vehicle wheels embodying an inner annular member, and an outer annular member, in combination with two series of springs of different sizes positioned between said inner and outer members, the small springs being attached to the large springs and the large springs being secured, alternately, to said inner and outer members.

4. A spring tire for vehicle wheels embodying an inner annular member, and an outer annular member, in combination with two series of springs of different sizes positioned between said inner and outer members, with the small springs secured to, and interspacing, the large springs, a portion of said large springs being secured, at a single point in each spring, to the inner member and another portion being secured, at a single point in each spring, to the outer member.

5. A spring tire for vehicle wheels embodying an inner annular member, and an outer annular member, in combination with two series of cylindrical springs of different sizes positioned between said inner and outer members, the small springs being secured to, and intermediate, the large springs and being out of contact with the inner and outer members, and said large springs contacting with said inner and outer members and being attached, alternately, to said inner and outer members.

6. A spring tire for vehicle wheels embodying an inner annular member, and an outer annular member, in combination with a plurality of springs positioned intermediate the inner and outer members and concentric therewith, said springs being secured, alternately, to the inner and outer members, respectively, whereby a part of the springs are attached to the outer member and are free of the inner member, and a part of the springs are attached to the inner member and are free of the outer member.

7. A spring tire embodying an inner annular member adapted to be positioned upon the felly of a vehicle wheel, and a larger outer annular member, in combination with a plurality of springs substantially circular in cross section positioned intermediate the inner and outer members and in contact therewith, said springs being interspaced by smaller springs which are free from contact with the inner and outer annular members, said smaller springs being also substantially circular in cross section.

8. A device of the class described embodying a felly, a rim, and two series of springs of different sizes intermediate the felly and rim, the springs of one series alternating with the springs of the other series, all of the springs being secured together to form a unitary structure, and the large springs secured alternately, at a single point, to the felly and rim, respectively.

9. A device of the class described embodying, an inner annular member adapted to be positioned about the felly of a vehicle wheel, means for securing said member in position on the wheel, an outer annular member, a plurality of springs of different sizes positioned intermediate said members and successively secured to one another, means for securing certain of said springs to the outer annular member, and means, independent of the means which secures the inner annular member to the felly of the wheel for securing certain of said springs to the inner annular member.

10. A device of the class described embodying an inner annular member, an outer annular member, and springs of different sizes in direct engagement, positioned intermediate said members and arranged concentrically therewith, said inner and outer members being provided with flanges positioned laterally of the springs, in combination with means, secured to said flanges, for protecting the springs from dust, dirt, etc.

11. A spring tire for vehicle wheels embodying an inner annular member, and an outer annular member, in combination with two series of cylindrical springs of different diameters positioned intermediate said inner and outer members and arranged concentrically therewith, the small springs alternating with the large ones and being secured to the latter along a line concentric with the inner and outer members, said large springs being attached, at a single point, alternately to the inner and outer members, leaving the springs alternately free for rolling movement on the member to which they are not attached.

12. A spring tire embodying an inner annular member adapted to be positioned about the felly of a vehicle wheel, and a larger outer annular member, in combination with two series of springs of different sizes positioned intermediate said inner and outer members, all of said springs being secured together, so as to have continuous, direct engagement along a circumferential line concentric with the inner and outer annular members, with the small springs alternating with the large ones, said springs coöperating so that, as the large springs are compressed radially of the wheel and expanded circumferentially thereof, the small ones are compressed circumferentially of the wheel and expanded radially thereof, thereby compensating for the pressure applied to the large springs, means for securing certain of the large springs to the outer annular member, means for securing certain of the large springs to the inner annular member, and means, independent of the means which secures the springs to the inner and outer annular members, for securing the inner annular member to the felly of a wheel.

13. A spring tire for vehicle wheels embodying a pair of concentric annuli spaced apart by a plurality of series of spring members, the springs of one of said series being of such dimensions as to engage with both the inner and outer annuli, and the springs of said series being alternately secured to said annuli, with the springs of another series positioned intermediate the springs of said first series and of such dimensions as to be free from engagement with said annuli, the successive springs of the different series contacting with one another, and means for securing said springs together at their points of contact.

14. A spring tire for vehicle wheels embodying a pair of concentric annuli, the outer one of which is provided with an inwardly projecting flange at one of its edges, and the inner one of which is provided with an outwardly projecting flange at the corresponding edge, said annuli collectively forming an annular channel, and a complementary annular channel member housing a plurality of resilient units, the inner and outer diameters of said second channel member being of such dimensions as to allow said second channel member to be positioned within the first channel member, and means for simultaneously locking said channel members in coöperative relation and securing both of them upon a vehicle wheel.

15. A spring tire for vehicle wheels embodying an inner annular member, and an outer annular member, in combination with two series of springs of different sizes positioned between said inner and outer members, the small springs being attached to the large springs and the large springs being secured, alternately, to said inner and outer members, said springs having direct, continuous engagement along a line concentric with the inner and outer annular members.

In testimony whereof I have signed my name to this specification.

CHARLES DRABEK.